Figure 1:
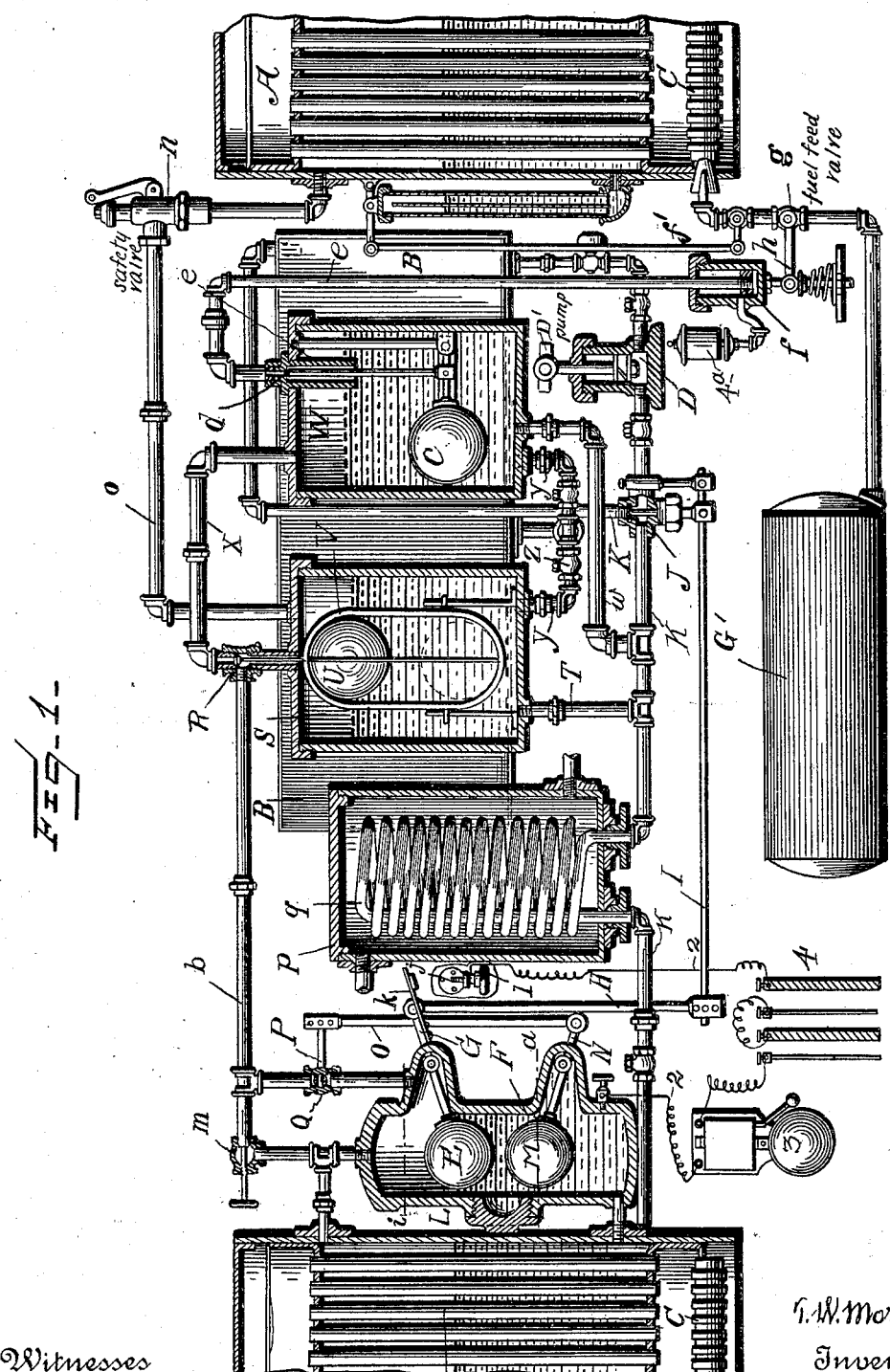

No. 695,325. Patented Mar. 11, 1902.
T. W. MORAN.
FEED WATER REGULATOR AND HIGH OR LOW WATER ALARM FOR STEAM BOILERS.
(Application filed June 11, 1901.)
(No Model.) 2 Sheets—Sheet 1.

Witnesses
R. A. Boswell
George M. Anderson

T. W. Moran,
Inventor
by E. W. Anderson
Attorney

No. 695,325. Patented Mar. 11, 1902.
T. W. MORAN.
FEED WATER REGULATOR AND HIGH OR LOW WATER ALARM FOR STEAM BOILERS.
(Application filed June 11, 1901.)
(No Model.) 2 Sheets—Sheet 2.
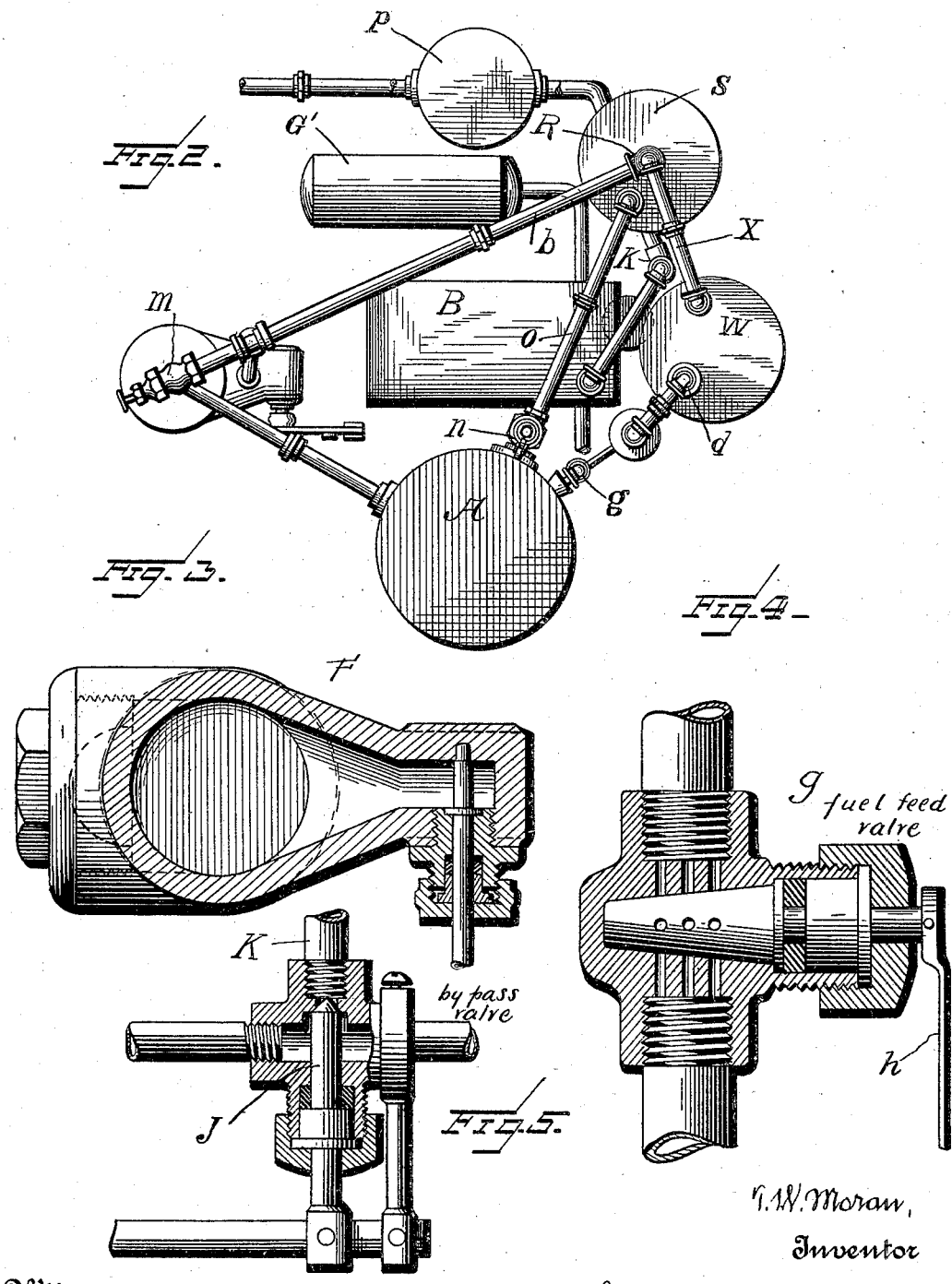
Witnesses
R. A. Boswell
George W. Anderson
T. W. Moran,
Inventor
by
E. W. Anderson
Attorney

UNITED STATES PATENT OFFICE.

THOMAS WILLIAM MORAN, OF LOUISVILLE, KENTUCKY.

FEED-WATER REGULATOR AND HIGH OR LOW WATER ALARM FOR STEAM-BOILERS.

SPECIFICATION forming part of Letters Patent No. 695,325, dated March 11, 1902.

Application filed June 11, 1901. Serial No. 64,106. (No model.)

*To all whom it may concern:*

Be it known that I, THOMAS WILLIAM MORAN, a citizen of the United States, and a resident of Louisville, in the county of Jefferson and State of Kentucky, have made a certain new and useful Invention in Float Feed-Water and Fuel Regulators and High or Low Water Alarms for Steam-Boilers; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a diagrammatic sectional view of my invention. Fig. 2 is a plan view of my regulating and alarm devices. Fig. 3 is a transverse section of the auxiliary water-chamber F. Figs. 4 and 5 are detail views of valves.

The invention has relation to automatic feed-water regulators for steam-boilers; and it consists in the novel construction and combinations of parts, as hereinafter set forth.

The invention relates more particularly to the utilization of the rise and fall of the water in the boiler in the accomplishment of the results in view through simple and efficient devices governing the water-feed and the fuel-supply and in connection therewith devices for causing an alarm when necessary.

In the accompanying drawings, illustrating the invention, its application to the boiler of an automobile carriage is displayed; but it will be found of more general application, and I do not, therefore, desire to confine it to any special class of boilers.

In the accompanying drawings, in which Fig. 1 shows the invention in a diagrammatic manner, the boiler being centrally broken, the letter A designates a steam-boiler, and F an auxiliary water-chamber having free communication at top and bottom with said steam-boiler and containing a high-water float and a low-water float.

C is the burner beneath the boiler.

D is the feed-water pump.

B is the water tank or supply.

E is a hollow ball-float in the chamber F, connected to the lever G.

H is a connecting-rod extending from the lever G to the by-pass valve J.

K is a return-pipe from valve J back to the water tank or supply.

M is a second and lower placed or submerged float in the chamber F, attached to the lever N and connected by the rod O to the lever P, which operates the valve Q.

S represents a supplementary condensing water-chamber, and W a second supplementary condensing water-chamber acting in alternation with the chamber S.

$b$ is a steam-pipe extending from the upper portion of the boiler and of the chamber F to the upper portion of the supplementary water-chamber S.

R is a three-way valve in said pipe.

T is a pipe extending from the bottom of chamber S and communicating with the discharge-pipe of the pump D.

$p$ is a chamber with which the steam-exhaust communicates and in which is the coil of pipe $q$, which forms a part of the feed-water pipe from the pump D to the boiler.

U is a hollow ball-float in the condensing water-chamber S, said float being free to move up and down in a cage V, of wire-cloth or other foraminated material, said cage limiting the movement of the float in either direction.

The cage V carries the piston of valve R, the piston-rod extending upward through the piping into the hollow of the valve, as shown.

X represents a pipe extension from the valve R to the second condensing water-chamber W, this chamber being also connected to the discharge-pipe of the feed-water pump by a pipe $w$.

Y is a pipe connecting the chambers S and W with the supply-tank B.

Z is a check-valve in pipe Y.

$c$ is a float in the chamber W, attached to a lever connected to the valve-piston of a valve $d$ in a pipe $e$, extending down into chamber W and having a branch extending down into the movable valve-chamber $f'$, with the piston $f$ of which said pipe $e$ is connected. This valve-chamber $f'$ is capable of moving up and down, and its stem passes through a spring and is connected to the lever $h$, which operates the valve $g$ in the fuel-supply pipe $g'$ from the fuel-tank G'.

*k* is a spring-arm attached to the outer end of lever G.

1 is an adjustable screw located under the spring *k* and forming one of the terminals of the electric circuit, (indicated at 2 2 2,) the other terminal being said spring *k*.

3 indicates an alarm.

4 indicates an electric battery.

*m* is a hand-valve in the pipe *b*.

*o* indicates an exhaust-steam pipe from the safety-valve *n* to the chamber S.

The operation of these devices is now to be explained. Having the boiler A and the water-tank B filled, as shown, proceed to light the burner C beneath the boiler, thereby causing steam to be generated in the boiler. Now supposing that the automobile be started, then the pump D will force water into the boiler, as it is connected to the cross-head D' of the engine and operates whenever the carriage is in motion. Now if the carriage is running on a level road, little steam will be used, and consequently the water will not be boiled away as fast as it enters the boiler, and the water-level will rise above that shown in the drawings, and as soon as this occurs the hollow ball-float E in the water-column in chamber F will be moved upward, causing the outer end of lever G to move downward, transmitting motion through the rod H to lever I, which is connected to the piston of the by-pass valve J, as shown, causing the by-pass valve to open and allowing the water coming from pump to go through pipe K and back to the water-tank instead of going to the boiler. In case of extreme high water this action also closes the electric circuit 2 2 and sounds the alarm. Now as steam is constantly being used and no water is entering the boiler the water-level in the same will begin to recede until the float E will resume its former position, closing the by-pass valve J, when water will again be pumped into the boiler; but supposing the pump should become inoperative from some cause and the water-level fall considerably below that shown in boiler—say below the line *a*—then the lower float M in the water-column in chamber F will move downward, causing the outer end of the lever N to move upward, transmitting motion through the rod O to the lever P, causing the valve Q to be opened, admitting live steam from the top of the water-column to pass on through pipe *b* to piston-valve R into the supplementary water-chamber S, as shown. This chamber has an opening in its bottom which is connected to the discharge-pipe of the pump D, and as soon as the steam enters the chamber S the pressure in it and the boiler will be equalized and the water in the chamber S will pass out through pipe T and into the boiler, this being caused by the difference of level of water in the boiler and in the chamber S. As the water in chamber S is passing out the hollow ball-float U, which is free to move up and down in the wire cage V, will begin to move downward and when nearly all the water has passed out the float U will strike the bottom of the cage V, which is connected at the top to the piston of valve R, and will fall, causing the piston to drop down on the lower seat of valve R, turning steam off from the chamber S and admitting it to chamber W through the pipe connection X, and the water in chamber W will be forced into the boiler in the same manner as it was from chamber S, as it is also connected to the discharge-pipe from the pump to the boiler. While this is taking place the chamber S will be closed, only having communication with the water-supply tank through pipe Y, as shown, and the remaining steam in chamber S will immediately condense, forming a partial vacuum in the same, which will cause the water to rush from the supply-tank into pipe Y through the check Z, filling the chamber S. As chamber S is filling the float U will move upward, and when the water has reached the level shown the float will strike the top of cage V, causing the piston in valve R to be forced to its upper seat, again admitting steam to chamber S and causing water to be forced into boiler as before, and while the chamber S is being emptied the chamber W is refilling from the supply-tank in the same way that the chamber S was filled, and when the chamber S is nearly empty steam will be turned off from the same and turned on to the chamber W, as before, causing its water to be forced into the boiler. It will therefore be seen that when one chamber is being emptied into the boiler the other is being refilled, and vice versa. This alternate action of supply will continue until the water-level has reached a point on line *a*, as shown in the water-column in chamber F, when the float M in said column will have reached its former position, thereby closing the valve Q, and thus shutting off steam from the pipe *b* and chambers S and W, so that no water will enter the boiler from chambers S and W at this time and any remaining steam left in the aforesaid chambers will be condensed, forming a vacuum, causing them to be filled with water from the supply-tank and be again ready for operation as soon as water falls below line *a*, so as to open the valve Q and turn steam into them, as before described; but supposing that when the supplementary water-chambers S and W are supplying water to boiler the water should be boiled away faster than they could supply it or the water-supply tank should become empty, so that the supplementary water-chambers would have no water to fill with, then these chambers would be entirely empty of water and the float *c* in the chamber W would drop down, opening the valve *d*, and steam would pass through said valve *d* and the pipe *e* to the fixed piston *f*, causing its chamber or cylinder to move downward, and as the lower end of the same is connected to the fuel-supply valve *g* through lever *h* it would cause this valve to close, extinguishing the fire beneath the boiler and saving the boiler from being overheated. As will be seen from the drawings, a small whistle $4^a$ can be connected to the side of the piston-cylinder, so that as the steam enters the cylinder and forces it down some steam will escape through an opening in its side and cause the whistle to sound, notifying the operator of the situation.

So far I have described the operation of my apparatus, considering how it would act under different conditions; but there is yet one condition to be mentioned—viz., what would occur supposing the carriage were running on a level roadway, and consequently using little steam, and that the pump was supplying water faster than required for use, causing the water to rise higher than needed? At first the float E in the water-column in the chamber F would rise and open the by-pass valve J, as before described, letting the water go to the supply-tank; but if the pipe K from the by-pass to the tank should be filled with something which would obstruct the passage of the water to the tank and it would necessarily have to pass on into the boiler then the water-level would tend to get higher and higher in the boiler, so as to allow no space for steam. In this case the float E in the water-column of chamber F would rise, say, to the line $i$, when the outer end of the lever G would move downward until the flat spring $k$ attached thereto would come in contact with point of the screw $l$, closing an electric circuit and causing the bell of the alarm device to ring and continue to ring as long as the water-level remains on line $i$ or higher, notifying the operator that water was too high in boiler, so that he could remedy the trouble before the water could reach a sufficient height to be drained over into the cylinder of the engine, an accident which might cause the heads of the same to be knocked out or do other injury.

There might be a time, when the carriage has been standing for several hours with steam up, that on the return of the operator he would find the water-level somewhat below the correct height in boiler, but not low enough to act upon the lower float M in the water-column. He can then easily bring the water to the proper height by simply opening the valve $m$ by hand, this action serving to admit live steam from the top of the water-column in chamber F to pass into the supplementary water-chamber S, causing the water in the same to enter the boiler, and when the water-level in the boiler has reached the proper height the operator has simply to turn off the steam, when water will cease to enter the boiler and the carriage will be ready to start with a full supply of water in the boiler.

The exhaust from the pop safety-valve $n$ is lead through the pipe $o$ into the chamber S, causing its action to be noiseless and condensing the steam instead of letting it go to waste. A feed-water heater $p$ is also provided containing the coil $q$, through which the water passes while on its way to the boiler. As the exhaust from the engine enters the bottom of the shell and passes up and around the coil and then out at the top, as shown, it raises the temperature of the water passing through the coil, effecting a saving in fuel, as is obvious. The heater also acts as a muffler, to some extent lessening the noise made by the exhaust.

A' is a tube communicating at its lower end with the lower portion of the boiler A. When water-line in boiler falls sufficiently, steam enters the tube, forcing the water out, steam taking its place. The hot steam expands the tube and operates the valve $a'$ through lever connections $a^2$ to shut the fuel off from the burner and avoid burning the boiler.

Having thus described my invention, what I claim as new, and desire to secure by Letters Patent, is—

1. The combination with a steam-boiler and its water-supply, of an auxiliary water-chamber having pipe connections with the boiler at top and bottom thereof, a by-pass valve in the water-feed pipe having a connection with a return-pipe to the water-supply, a float in said auxiliary chamber arranged to control said valve and to sound an alarm when the water in the boiler reaches a dangerously-high point, a supplementary water-supply chamber, and a second low-water float in said auxiliary chamber arranged to control the supply of water thereof to the boiler, substantially as specified.

2. The combination with a steam-boiler, and its water-supply, of an auxiliary water-chamber, having pipe connections with the boiler at top and bottom thereof, a high-water float in said chamber, means operating in connection therewith whereby further supply of water to the boiler is prevented, a low-water float in said chamber, and means operating in connection therewith, whereby the supply of water to the boiler is renewed, substantially as specified.

3. The combination with a steam-boiler and its water-supply, of an auxiliary water-chamber having pipe connections with the boiler at top and bottom thereof, a high-water float in said chamber, means operating in connection therewith, whereby further supply of water to the boiler is prevented, and means operating in connection therewith for sounding an alarm at dangerously-high water, a low-water float in said chamber, means operating in connection therewith, whereby the supply of water to the boiler is renewed, and means operating in connection with said low-water float, whereby an alarm is sounded at dangerously-low water, substantially as specified.

4. The combination with a steam-boiler and its water-supply, of an auxiliary water-chamber having pipe connections with the boiler at top and bottom thereof, a by-pass valve in the water-feed pipe, having a connection with a return-pipe to the water-supply, a float in said chamber arranged to control said valve, two supplementary water-supply chambers, a second low-water float in said auxiliary chamber, and devices in connection therewith for controlling the supply of said supplemental chambers, substantially as specified.

5. The combination with a steam-boiler and its water-supply, of an auxiliary water-chamber having pipe connections with the boiler at top and bottom thereof, a by-pass valve in the water-feed pipe having a communication with a return-pipe to the water-supply, a high-water float in said chamber arranged to control said valve, two supplementary water-supply chambers having a steam connection with the boiler, a valve in such connection, and a second low-water float in said auxiliary chamber controlling said steam-valve, substantially as specified.

6. The combination with a steam-boiler and its water-supply, of an auxiliary water-chamber having pipe connections with the boiler at top and bottom thereof, a by-pass valve in the water-feed pipe having a communication with a return-pipe to the water-supply, a high-water float in said chamber arranged to control said valve, and means operating in connection with said float, whereby an alarm is sounded at dangerously-high water, substantially as specified.

7. The combination with a steam-boiler, and its water-supply, of an auxiliary water-chamber, having pipe connections with the boiler at top and bottom thereof, a high-water float in said chamber having means in connection therewith whereby further supply of water to the boiler is prevented, a supplementary water-supply chamber, having a steam connection with the boiler, a valve in said connection, and a low-water float in said chamber arranged to control such steam-valve, substantially as specified.

8. The combination with a steam-boiler and its water-supply, of an auxiliary water-chamber, having pipe connections with the boiler at top and bottom thereof, a high-water float in said chamber having means in connection therewith whereby further supply of water to the boiler is prevented, two supplementary water-supply chambers having a steam connection with the boiler, a valve in said connection, a low-water float in said auxiliary chamber controlling such steam-valve, a valve for the steam connection of said supplementary chambers, and a float in one of said chambers for controlling such valve, substantially as specified.

9. The combination with a steam-boiler, and its water-supply, of the auxiliary water-chamber having pipe connections at top and bottom thereof with the water-chamber of the boiler, a by-pass valve in the water-feed pipe, a return-pipe to the water-supply, a float in said auxiliary chamber arranged to control said valve, an alarm device, and means for closing an electric circuit and sounding such alarm when the water in the boiler has reached a dangerously-low point, substantially as specified.

10. The combination with a steam-boiler, and its water-supply, of an auxiliary water-chamber connected at top and bottom with said boiler, its upper or high-water float, its lower or low-water float, a by-pass valve in the water-feed pipe, a return-pipe therefrom to the water-supply, alternating condensing water-chambers having connections with the water-supply, the check-valves in such connections, a steam-pipe from the boiler in connection with the condensing water-chambers, a steam-valve therein, and a caged float in one of said condensing water-chambers operating such steam-valve, substantially as specified.

11. The combination with a steam-boiler, and its water-supply, a water-chamber connected to said boiler at top and bottom, and a low-water float therein, of alternately-acting condensing water-chambers having connections with the water-supply, the check-valves in such connections, the steam-pipe, its valve, the float-cage connected to such valve, and the float therein, substantially as specified.

12. The combination with a steam-boiler, and its water-supply, of the auxiliary chamber connected thereto at top and bottom, the alternately-acting condensing water-chambers, in connection with the water-supply, the check-valves, the valved steam connection of said condensing water-chambers with the boiler, and float devices for operating the same, substantially as specified.

In testimony whereof I affix my signature in presence of two witnesses.

THOMAS WILLIAM MORAN.

Witnesses:
R. H. COURTNEY, Jr.,
E. E. SUTTON.